US012601589B2

(12) United States Patent
Yang et al.

(10) Patent No.: US 12,601,589 B2
(45) Date of Patent: Apr. 14, 2026

(54) MEASURING SYSTEM PROVIDING SHAPE FROM SHADING

(71) Applicant: HEXAGON INNOVATION HUB GMBH, Heerbrugg (CH)

(72) Inventors: Zheng Yang, Friedrichshafen (DE); Johan Stigwall, St.Gallen (CH); Thomas Jensen, Rorschach (CH)

(73) Assignee: HEXAGON INNOVATION HUB GMBH, Heerbrugg (CH)

( * ) Notice: Subject to any disclaimer, the term of this patent is extended or adjusted under 35 U.S.C. 154(b) by 129 days.

(21) Appl. No.: 18/525,239

(22) Filed: Nov. 30, 2023

(65) Prior Publication Data

US 2024/0175677 A1 May 30, 2024

(30) Foreign Application Priority Data

Nov. 30, 2022 (EP) ..................................... 22210549

(51) Int. Cl.
*G01B 11/25* (2006.01)
*G06T 7/73* (2017.01)

(52) U.S. Cl.
CPC ...... *G01B 11/2522* (2013.01); *G01B 11/2513* (2013.01); *G01B 11/2545* (2013.01); *G06T 7/75* (2017.01)

(58) Field of Classification Search
CPC ..... G01B 11/24; G01B 11/25; G01B 11/2513; G01B 11/2441; G01B 11/2509; G01B 11/303; G01B 11/22; G01B 11/162; G01B 11/2518; G01B 11/00; G01B 11/245; G01B 11/30; G01B 11/12; G01B 11/2545; G01B 11/0608; G01B 11/002;

G01B 11/254; G01B 21/30; G01B 11/14; G01B 11/0691; G01B 15/04; G01B 2290/65; G01B 9/02091; G01B 11/2527; G01B 11/306;

(Continued)

(56) References Cited

U.S. PATENT DOCUMENTS

2019/0056218 A1* 2/2019 Ulmer .................. G01B 11/005
2019/0104980 A1* 4/2019 Farooq ................. A61B 5/0037

FOREIGN PATENT DOCUMENTS

CN          110487214 A  * 11/2019   ......... G01B 11/2513
DE      102017122627 A1 *  3/2019   ............ G01B 11/25

(Continued)

OTHER PUBLICATIONS

Extended European Search Report dated May 11, 2023 as received in Application No. 22210549.6.

*Primary Examiner* — Michael P Stafira
(74) *Attorney, Agent, or Firm* — Maschoff Brennan

(57) ABSTRACT

A measuring system for measuring an object, the measuring system comprising a measuring device and a controlling and processing unit. The measuring device comprises at least one camera, a first optical sensor and a second optical sensor, the first optical sensor provides a first field of view and is configured for collecting first measuring data representing a first part of the object, the second optical sensor provides a second field of view and is configured for collecting second measuring data representing a second part of the object. The second optical sensor comprises at least three light sources configured for illuminating the object from at least three different poses. The controlling and processing unit comprises a second capturing mode.

13 Claims, 3 Drawing Sheets

(58) Field of Classification Search
CPC ...... G01B 21/20; G01B 9/02; G01B 9/02021; G01B 9/0209; G01B 15/08; G01B 21/042; G01B 11/007; G01B 11/2504; G01B 11/2522; G01B 13/16; G01B 21/047; G01B 11/022; G01B 11/26; G01B 2210/286; G01B 3/30; G01B 11/2408; G01B 11/2433; G01B 11/2536; G01B 3/40; G01B 3/48; G01B 5/0002; G01B 5/0004; G01B 5/008; G01B 5/201; G01B 5/213; G01B 5/28; G01B 11/005; G01B 11/02; G01B 11/03; G01B 11/167; G01B 21/16; G01B 2210/52; G01B 2210/54; G01B 9/02009; G01B 9/0203; G01B 9/02076; G01B 9/02096; G06T 17/00; G06T 2207/10028; G06T 19/20; G06T 19/006; G06T 2207/10024; G06T 7/0012; G06T 2207/10016; G06T 17/20; G06T 7/586; G06T 2207/10068; G06T 7/507; G06T 2207/20081; G06T 7/11; G06T 2207/20084; G06T 2207/30201; G06T 7/521; G06T 2200/04; G06T 7/73; G06T 2207/10152; G06T 7/0004; G06T 2207/20221; G06T 2219/2021; G06T 7/70; G06T 2207/10012; G06T 7/90; G06T 7/50; G06T 7/593; G06T 7/55; G06T 13/40; G06T 15/506; G06T 2207/30164; G06T 5/50; G06T 2200/08; G06T 15/04; G06T 15/00; G06T 2200/24; G06T 2207/20016; G06T 2207/30196; G06T 7/74; G06T 2210/41; G06T 11/001; G06T 2207/10048; G06T 19/00; G06T 7/75; G06T 7/80; G06T 11/00; G06T 2207/30004; G06T 3/4038; G06T 7/60; G06T 2207/20212; G06T 2207/30032; G06T 3/40; G06T 2219/2012; G06T 15/50; G06T 17/05; G06T 7/0016; G06T 15/205; G06T 2207/20021; G06T 7/246; G06T 7/40; G06T 15/08; G06T 15/10; G06T 2207/30024; G06T 15/80; G06T 7/33; G06T 7/337; G06T 2207/10116; G06T 15/20; G06T 2207/30036; G06T 2207/30204; G06T 7/12; G06T 11/60; G06T 17/30; G06T 2207/20208; G06T 15/06; G06T 2200/32; G06T 2207/30244; G06T 5/92; G06T 15/005; G06T 2207/30096; G06T 2210/22; G06T 3/60; G06T 7/001; G06T 7/194; G06T 11/206; G06T 2207/10004; G06T 7/579; G06T 7/62; G06T 2207/30088; G06T 2210/04; G06T 7/0002; G06T 7/20; G06T 7/514; G06T 2207/30108; G06T 5/77; G06T 7/00; G06T 7/30; G06T 2207/20056; G06T 7/248; G06T 17/205; G06T 2219/2004; G06T 11/005; G06T 2207/30141; G06T 2207/30252; G06T 7/97; G06T 2207/10061; G06T 2207/20076; G06T 2207/30028; G06T 2215/16; G06T 3/067; G06T 5/70
See application file for complete search history.

(56) References Cited

FOREIGN PATENT DOCUMENTS

| | | | | | |
|---|---|---|---|---|---|
| DE | 102018002622 | A1 | * 10/2019 | ............ | G01B 21/20 |
| EP | 3258211 | A1 | * 12/2017 | ............ | H04N 23/56 |
| WO | WO-2017174663 | A1 | * 10/2017 | ............ | H04N 23/64 |

* cited by examiner

MEASURING SYSTEM PROVIDING SHAPE FROM SHADING

FIELD

The present disclosure relates generally to systems and methods for determining surface topography information of an object based on optical measurements utilising at least two optical measuring principles.

BACKGROUND

The optical acquisition of three-dimensional (3D) information of an object, such as a work piece or a human body, typically entails the use of multiple cameras and light sources, arranged relative to the object, that are activated while the object remains still. The number of cameras and light sources required typically depends in direct relation on the size of the area to be imaged and/or on the accuracy to be reached.

It is common practice to inspect technical work pieces subsequent to production e.g. on a coordinate positioning apparatus, such as a coordinate measuring machine (CMM), in order to check for correctness of predefined object parameters, like dimensions and shape of the object. Moreover, a detection of a surface of an unknown object is of interest in many industrial applications. Such measurement typically also may be provided using a coordinate measuring machine or any other suitable type of scanning device. An advantage of using an optical sensor is that it is not in contact with the part and therefore does not manipulate or deform it during the measurement or damage it, as may be the case with a tactile probe.

A device for providing a topographic measurement of a surface can be embodied as a (hand-held) device comprising a triangulation sensor, wherein the device is guided along the surface to be measured—either manually or by a CMM—and distance data is acquired by the sensor while moving the device. Additionally, the position and/or orientation of such device may continuously be determined (e.g. tracked) in a global coordinate system thus enabling a determination of absolute coordinates corresponding to the object's surface A further aspect is related to capture respective surface information related to a human body, e.g. body data related to a face or other part of a body of a person. Such information is typically acquired for aesthetic procedures, surgical procedures or for diagnosis of skin conditions.

For example, a number of new face rejuvenating procedures join the existing approaches in the aesthetic industry every year; these may include without limitation pharmacology based topical solutions, minimally invasive and invasive surgery, and energy based treatments such as laser and other photon based systems, ultrasound approaches, radio frequency, cold (cryo), microwave, and Multiple Energy Delivery Systems (MES).

In many aesthetic procedures, such as topical or energy-based face rejuvenation, the subject does not exhibit immediate positive results from the treatment and must wait an extended period of time, potentially receiving additional treatments to complete the procedure. It would be advantageous to provide, approximate the time of treatment, an estimate to the subject of the expected results after a certain amount of time has passed. Before and after graphics of previously treated subjects are known, but the current subject would best be served seeing the projected results on his/her own image.

Furthermore, for applying a recommended aesthetic procedure detailed knowledge about the person's skin at least in a region of interest may be required. The region of interest typically can be a comparatively small part of the person's body like small wrinkles in the person's face.

With view to surgical procedures similar requirements apply. Information about body or skin conditions at a particular region of interest, e.g. a region of the person's body at which a surgical intervention should be performed, is highly desired. Such body information about that specific region should typically be of an increased information level compared to neighbouring body parts.

Existing systems are typically capable of capturing (whole-body) images which provide to derive surface information of a consistent quality level over the entire object to be measured. There may additionally be a choice of which technique is to be applied for capturing the images, e.g. choosing the type or polarisation of the used illumination light. By that, particular conditions or properties of the object, in particular of organic materials or skin, can be investigated.

However, a downside of this solution is that an object typically is measured with one particular measuring method and object information is limited to the data available by means of that measuring method. Hence, a resolution or sensitivity provided by that method is respectively limited.

SUMMARY

Therefore, it is an object to provide an improved measuring system or method which provides improved acquisition of surface data of an object.

A further object is to provide a measuring approach capable of providing improved measuring data with respect to measuring a human body.

The disclosure relates to a measuring system for measuring an object like a technical work piece or a human body. The measuring system comprises at least a measuring device and a controlling and processing unit.

The controlling and processing unit can be embodied as a single component arranged together with (e.g. in) the measuring device or being physically separated from the measuring device. The controlling and processing unit may alternatively or additionally be implemented to provide several components, the components preferably being configured for exchanging information with each other. The controlling and processing unit is configured for bi-directionally transmitting (sending and receiving) signals (information) to and from the measuring device. The controlling and processing unit can be provided by an algorithmic processing device like a computer, a tablet, a smart phone, a (web or network) server or the like. In particular, the controlling and processing unit can be provided by a data-storing and/or data-processing cloud.

The measuring device comprises two optical sensors, i.e. a first optical sensor and a second optical sensor. The first optical sensor can provide a first field of view which is equal to or greater (in particular at least two times greater) than a second field of view of the second optical sensor. The first optical sensor can thus be considered to be a global optical sensor while the second optical sensor provides a local optical sensor. The first optical sensor and the second optical sensor can be arranged so that the first part of the object can include the second part of the object.

The measuring system provides registration of measuring data which can be generated by the two sensors. The first measuring data of the first sensor and the second measuring data of the second sensor can be processed so that there is provided a particular linking of the data. The first and second measuring data are associated or referenced to each other. In one embodiment the data can be merged or fused to provide one extended data set.

In particular, respective coordinate systems of the measuring sensors or of the obtained data can be referenced to each other.

To register high resolution measurements of the second sensor, a tracking sensor can be provided that tracks the 6DOF pose of the measuring device relative to the object or human body. Thus, the relative location of every local acquisition is known. The tracking sensor can also provide a lower resolution global 3D model and medium-resolution colour texture data that can be used for visualization and navigation of the local dataset. The tracking sensor can preferably be provided by the first sensor.

The tracking can be done using different sensor technologies (see below). Two particular methods being 3D point cloud matching between each measurement of second measuring data (e.g. 3D scan) and the global 3D model (e.g. based on the first measuring data), and visual SLAM (simultaneous localization and mapping) based on e.g. facial features that are tracked in the 2D images.

The tracking function can be used to guide an operator in real-time to the right distance to get well focused local scans of the object, and to the right locations to scan specific details. In particular, with an integrated display, the local scanner (second optical sensor) field of view (FOV) can be visualized on top of the live image from a tracker camera, and the user can be guided to the correct positions and focus distance by displaying symbols or augmented reality on the screen.

The local scanner has to be positioned at the correct distance from the surface to be scanned (in case of a fixed focus). To enable this, the global tracking sensor could be used to guide the user in real-time and trigger a local measurement when the distance is optimal. Instead of real-time triggering, which would require a very low latency tracking sensor, the camera acquisition could also run continuously, and the best images could be selected afterwards. This alternative needs less bright lighting, a sensor with lower frame rate and less processing (no burst averaging). The user, however, would need more accurate guiding to reach the correct distance, so the requirements on UI and tracking latency are higher.

Alternatively, if the local scanner has a lens with motorized focus (gears, voice-coil, liquid lens etc.), an auto-focus feature could be implemented based on the tracking sensor's distance reading. This would allow the user more flexibility in positioning the scanner. Using the tracking sensor (first optical sensor) instead of the local camera image itself as input to the auto-focus algorithm is beneficial since the former provides an absolute distance measurement over a larger depth range. Thanks to a large working distance range and less issues with motion blur, an auto-focused large-aperture local sensor is the most convenient to the user.

Hence, the disclosure relates to a measuring system for measuring an object like a technical work piece or a human body. The measuring system comprises a measuring device and a controlling and processing unit. The measuring device comprises at least one camera, a first optical sensor and a second optical sensor.

The first optical sensor provides a first field of view and is configured for collecting first measuring data representing a first part of the object and the second optical sensor provides a second field of view and is configured for collecting second measuring data representing a second part of the object. In particular, the sensors can be configured so that the first field of view can be equal to or greater than the second field of view, wherein the first optical sensor and the second optical sensor can be arranged so that the first part of the object includes the second part of the object.

The second optical sensor comprises at least three light sources configured for illuminating the object from at least three different poses or directions. The controlling and processing unit comprises a second capturing mode which is configured to provide the second measuring data by illuminating the object from the at least three different poses by performing at least three illumination steps with each illumination step providing illumination by one of the three light sources, capturing at least three images by capturing an image for each of the illumination steps and deriving surface topography information based on processing the at least three images and the at least three different poses of the light sources.

The controlling and processing unit comprises a referencing functionality which is configured to provide registered measuring data by referencing the first measuring data with the second measuring data.

The present disclosure combines two sensors (local and global) to make it possible to also perform a hand-held non-contact scan of a whole or a part of an object or a human body with both high local resolution, global coverage, automatic registration, focusing and motion compensation for the local measurements.

The first and/or the second measuring data can be provided as any kind of measuring data representing the surface of the object, in particular representing the topography of the surface.

In particular, the first and/or the second measuring data can be provided as three dimensional (3D) point cloud data.

In particular, the resolution of the second measuring data is greater than the resolution of the first measuring data. The density of points of the second measuring data can be greater than the density of points of the first measuring data, in particular when the first and the second measuring data are provided as point clouds.

In one embodiment, the at least three illumination steps can be performed successively, in particular by providing illumination by one of the three light sources different from a light source activated before.

In one embodiment, the at least three illumination steps can be performed simultaneously, in particular by providing illumination by the at least three light sources at the same time.

In particular, the at least three illumination steps are performed by providing a particular illumination wavelength with each of the at least three light sources, wherein the particular illumination wavelengths of the light sources are different from each other respectively.

Simultaneous illumination can also be provided by using multiplexing technologies such as using RGB illumination and RGB sensor (camera). Sequential illumination can be provided e.g. by using synchronized flashing and three tap TOF sensors.

In one embodiment, the at least one camera can be part of the first optical sensor and/or part of the second optical sensor. In particular, measuring device can comprise a plurality of cameras, wherein a first portion of the cameras (at least one) is assigned to the first sensor and a second portion (at least one camera) is assigned to the second sensor. Alternatively or additionally, there may be a particular set of cameras which is utilised by the first and the second sensor for respective data acquisition.

According to one embodiment, the first optical sensor can comprise a global light illumination source. The global light illumination source can provide sufficient illumination of the first part of the object for detection of respectively sensitive surface properties during light illumination. In particular, the global light illumination source can be a white light illumination source.

White light illumination can in particular be used for detecting colour information of object texture. For measuring 3D data, monochromatic illumination can be used alternatively. For measuring human skin (which is a volume scatterer), blue or green light can be favourable since e.g. blue light does penetrate less in the skin than e.g. red light. To avoid volume scattering when using red or white illumination, polarisation can be used.

In particular, the global (white) light illumination source can comprise polarised filtering of a first orientation and the at least one camera can comprise polarised filtering of a second orientation orthogonal to the first orientation. Orthogonal polarisation can provide to eliminate specular reflections. Respective filtering can be provided by combining a respective optical filter with the (white) light illumination source and the camera.

In particular, the global light illumination source can comprise polarised filtering of a first orientation and the at least one camera can comprise polarised filtering of a second orientation parallel to the first orientation. Parallel polarisation can provide to avoid unwanted volume scattering for 3D measurements, e.g. when the first sensor is embodied as an active triangulation sensor.

In particular, the global light illumination source can be provided by at least two of the at least three light sources of the second optical sensor. By that, at least two of the light sources are configured to emit light for illumination of the object. Such light source(s) can respectively be controlled to emit (white) light for image capturing with the first sensor.

In one embodiment, the first optical sensor can be implemented as a triangulation sensor having a pattern projector for projecting a light pattern on the object. In particular, the light pattern may be provided by a sequence of patterns. In particular, the pattern projector is configured to emit infrared or ultraviolet light and the pattern is projected in the respective wavelength range. Accordingly, the camera can be built to detect light of the respective wavelength range.

In one embodiment, the first optical sensor can be implemented as a triangulation sensor providing object texture features recognition. Such embodiment enables to avoid projection of a pattern but applies (image) processing of captured data in order to identify particular point of interest.

In particular, the triangulation sensor comprises at least two cameras, the cameras being arranged with defined and known poses (spatial position and orientation) relative to the pattern projector. Such arrangement provides an active-stereo triangulation system.

According to one embodiment, each of the at least three light sources of the second optical sensor can comprise polarised filtering of a first orientation and the at least one camera can comprise polarised filtering of a second orientation parallel to the first orientation.

According to one embodiment, the second measuring data can be provided by performing a shape-from-shading (SFS) measurement and the surface topography information can be provided as surface normal information, in particular as a normal map or height map. Hence, the second measuring data can be derived based on the SFS measurement as further described below in detail.

In one embodiment, the controlling and processing unit can comprise a first capturing mode which is configured to provide the first measuring data by illuminating the object or projecting a pattern on the object by means of the first optical sensor (in particular illuminating the object comprises an embodiment of projecting a pattern), capturing a set of images of the object during illuminating the object or projecting the pattern on the object and deriving the first object data based on processing the set of images.

In particular, the first capturing mode comprises a step of deriving a point cloud for the first part of the object, e.g. based on the set of images.

In particular, the first capturing mode comprises a step of deriving a digital model of the first part of the object, e.g. based on the derived point cloud.

The first sensor and the first measuring data thus can provide triangulation-based measurement and efficient and precise determination of surface information regarding an object to be measured. The surface information is preferably determined in form of a point cloud.

In one embodiment, the referencing functionality can be configured to provide the registered measuring data as an enhanced digital model by computing a digital model of the first part of the object by means of the first capturing mode, the digital model provides rough surface normal information. The digital model of the object can preferably be computed based on the point cloud data provided by a triangulation measurement. In a further step, the surface topography information can be provided as fine surface normal information by performing a shape-from-shading (SFS) measurement by means of the second capturing mode, i.e. by executing the second capturing mode. The digital model can be updated to provide the enhanced digital model by adjusting the rough surface normal information utilising the fine surface normal information, in particular by replacing the rough surface normal information with the fine surface normal information.

In particular, a relative surface normal information can be derived based on processing the rough surface normal information and the fine surface normal information. Alternatively or additionally, the relative surface normal information can be derived based on lowpass-filtering the fine surface normal.

In particular, the referencing functionality can comprise the step of reconstructing a displacement map based on the fine and/or relative surface normal information provided by the SFS measurement.

In one embodiment, the controlling and processing unit can comprise a motion compensation functionality which is configured to provide compensated surface topography information by tracking of a position and/or orientation of the object relative to the measuring device while performing the second capturing mode, determining a relative orientation information for each of the at least three images based on the tracking, computing an adjusted orientation for at least one of the at least three images for providing corresponding orientations of the at least three images, and deriving the compensated surface topography information by deriving the surface topography information by additionally processing the adjusted orientation.

In one embodiment, the first optical sensor can be configured for collecting the first measuring data by applying a simultaneous localisation and mapping (SLAM) algorithm during relative movement of the measuring device and the object.

In one embodiment, the measuring device can comprise a hand-held body and the at least one camera, the first optical sensor and the second optical sensor are arranged in or at the hand-held body.

A workflow for with such hand-held device (or other stationary embodiments) can comprise the following steps:

A first facial measurement can be performed comprising a pre-scan with scanning the face by moving left-to-right, up-and-down. The working distance should ideally be a bit larger, e.g. 50 cm, to improve comfort for the patient/ customer. A rough 3D model is calculated. Next, a local data is acquired with real-time tracking. A 6DOF pose of the scanner is calculated by matching the 3D tracking sensor data to the rough model. The user is guided to a wanted scan location, e.g. wrinkles on the side of the eye, at exactly the right distance to be within the very small depth of focus of the local sensor. The working distance is likely shorter (e.g. 10-15 cm) to suit the requirements of the local sensor. Next, analysis is performed by using the global scan as index. A 3D model is calculated from the global scanner data. The local scans are marked e.g. by rectangles on the surface of the rough 3D model. By clicking one of the rectangles, the corresponding local scan data is opened and viewed independently of above analysis. Alternatively to above analysis, merged analysis can be performed. Here, a 3D more precise model is calculated from the global scanner data. The local scan data is merged with this 3D model, e.g. by updating the texture maps or by refining the mesh. The local scans are marked by rectangles on the surface of the rough 3D model. By clicking one of the rectangles, the app zooms in on the local scan area to allow inspection directly in the 3D view. Skin analysis with 3D profiles, statistics etc. can be displayed directly on the 3D view or floating beside it.

A second facial measurement can be performed. If a subject has previously been scanned, the pre-scan step above can be omitted. Local data acquisition can be performed as above. Next, a before/after comparison can be performed. If the same subject has been scanned on another occasion, the software automatically can look up scans acquired from the same location and allows the user to easily switch between them or to display the images side-by-side.

In an alternative workflow, the hand-held device can be guided by a user or a robot in industrial metrology field, e.g. to detect defects with a high-resolution second sensor on e.g. an air turbine blade measured by the first sensor for localising the defect relative to an outer blade geometry.

The disclosure also relates to a method for measuring an object by means of a measuring device. The method comprises aligning the object relative to the measuring device, obtaining first measuring data related to a first part of the object by directing first measuring light to the object and receiving second measuring light, wherein the second measuring light corresponds to at least a part of the first measuring reflected at the object, obtaining second measuring data related to a second part of the object by illuminating the object from the at least three different poses, capturing at least three images by capturing at least one image for each of the illuminations and deriving surface topography information based on processing the at least three images and the at least three different poses, and assigning the first measuring data to the second measuring data.

In one embodiment, the illumination can be provided simultaneously from the at least three different poses. Alternatively, the illumination can be provided successively from the at least three different poses.

In one embodiment, the first measuring data can be obtained by projecting a pattern on the object, capturing a set of images of the object during projecting the pattern and deriving point cloud data as the first measuring data based on processing the set of images. Such measuring procedure can in particular correspond to a triangulation measurement.

In one embodiment, an enhanced digital model can be obtained by computing a digital model of the first part of the object by means of the first measuring data, the digital model provides rough surface normal information, providing the surface topography information as fine surface normal information by performing a shape-from-shading (SFS) measurement, and updating the digital model to provide the enhanced digital model by adjusting the rough surface normal information utilising the fine surface normal information, in particular by replacing the rough surface normal information with the fine surface normal information.

In one embodiment, the method can comprise any of the steps provided by the controlling and processing unit of the measuring system described above.

The disclosure also relates to a computer program product, which, when executed by a computing unit, in particular by the controlling and processing unit, causes the automatic execution of the steps of the method above.

In one embodiment, the first sensor can provide both a 6DOF pose of the measuring device and a global 3D model of the object or human body to be scanned. A sensor type which provides a "single shot" dense 3D scan of the object or body which can be used both to create the global model and for registration by matching each single frame of 3D points to the global model using e.g. the iterative closest point (ICP) algorithm.

Alternatively or additionally, sparse (non-dense) visual SLAM can be implemented, whereby a smaller number (e.g. hundreds) of surface features are automatically found and tracked to calculate the relative 6DOF pose. The global 3D model for display and navigation could then be calculated at a later stage.

Alternatively or additionally, specialized facial tracking algorithms could be used to track the sensor pose as well as facial expressions based on images from a regular camera, stereo camera, or 3D sensor.

In one embodiment, the first sensor can provide 6DOF tracking of a person's head, hand, chest, or other body part. The sensor can be provided to work hand-held and without requiring fixation of the subject's body. The tracking system thus can track the relative pose between the measuring device or sensor and the body or object.

When scanning a face/body, the expression may change slightly during the scan, so some flexibility regarding this when registering the data may be required. For instance, facial expression tracking as known from motion capture could be used to increase the accuracy of registration.

The first sensor is preferably embodied to provide a rough 3D model of e.g. 1 mm mesh grid resolution and/or e.g. 0.2 mm colour texture pixel resolution. The high resolution texture can make the 3D model appear more detailed than it actually is.

To make the first sensor less obtrusive, infrared (IR) light can be used for active illumination. On the other hand, IR-light penetrates deeper into skin and may cause some systematic form errors. For minimal penetration and the best possible resolution, here blue light may be preferred.

Alternatively or additionally, to provide colour texture a white light source is required. This can be a large diffuse area source in order to reduce blinding and minimise shadow formation. Having a built in active light-source is preferred since it would allow the camera to work well in any environment, and the controlled colour temperature of the built-in source would make it possible to also perform absolute colourimetry.

To reduce motion blur, it can be preferred to have a high peak-power flashed illumination and global shutter cameras.

In one embodiment, the first sensor can be provided by one of the following sensor types (mainly providing 3D scanning capability and typically be combined with a regular 2D colour camera for texture mapping):

LIDAR point scanner

Multi-point LIDAR

Indirect time-of-flight (iTOF) using CMOS sensor (phase-measurement with periodically modulated light).

Direct time-of-flight (dTOF) sensor using SPAD (single photon avalanche diode) array and pulsed light.

Stereo vision 3D sensor with active pattern projection to get more texture on feature-less surfaces.

Fringe projection scanner (several different patterns projected in sequence)

Structured light (dot projector and single camera),

Single-shot stereo reconstruction (passive, i.e. without pattern projection).

Single-shot passive triple-camera stereo reconstruction. The three cameras could either be on a perfectly straight line to reduce processing requirements (single rectification, 1× triple-image-matching instead of 3× two-image matching). Or, non-straight (e.g. corners of equilateral triangle) to get better coverage around nose (due to shadowing) and enable matching on features of any orientation.

Multi-view, "SLAM" (simultaneous localization and mapping), stereo reconstruction using stereo camera or single camera.

Grid-projection with two cameras, single-shot multi-line triangulation

In one embodiment, the second sensor could be embodied as a local high resolution scanner using shape-from-shading (SFS; also called stereophotometry or photometric stereo). At least one camera with several light sources at different angles of incidence is used to measure the surface normal in each point, and then reconstruct the 3D form. This can provide very high resolution. Multiple (at least three) sequential or simultaneous illuminations and images are captured, at least one image for each of the light sources. The high resolution can relate to both high lateral and high depth resolution.

The primary measurement data of SFS are the surface slopes along two orthogonal x- and y-axes. A height map can be calculated from integrating the slope data. The basic mechanism of signal formation relies on a-priori knowledge of the surface scattering characteristics, such as Lambertian scatterer or BRDF function mostly.

At least one single camera is needed to observe the object. Typically, four light sources are evenly distributed placed around the camera. Assuming the Lambertian characteristics, the intensity $E_i(x,y)$ of ith exposure is dependent of the albedo $\rho$ and the cosine function of the angle between local surface normal $\vec{n}$ (x,y) and illumination vector $\vec{s_i}$ of ith light source.

Although three light sources (three exposures) are sufficient to solve the surface normal from intensity measurements, in practice four light sources are commonly implemented to generate an overdetermined equation system for improving robustness against noise and specular reflex.

After the surface normal is numerically integrated, the height map can be reconstructed. The numerically integration can be performed either locally by integration along selected path or globally by Fourier-transformation or numerical methods in least-square manner. The advantage is the extremely high dynamic range (depth range/noise) compared to other 3D sensor types, as the integration procedure acts inherently as a denoising operator (low-frequent part amplified, high-frequent part deamplified), while the lateral resolution is preserved. This is why this approach is regarded as one of most information-efficient 3D approaches.

However, the implementation effort is shifted from hardware to the software, as the integration algorithms is usually computationally intensive. Small systematic error in the slope data will result in significant low-frequent systematic error in the height map, therefore the calibration of camera and illumination units need to be as accurate as possible.

The high resolution of the second sensor also increases the sensitivity to motion blur. To avoid taking images during e.g. too strong motion, a tracking sensor could be used to guide the object or user to be still, and then only trigger local measurement when relative movement is below a certain threshold. This could either happen in real-time or by selecting the stillest images after acquiring a longer burst of images.

Of course, it can also be beneficial to have a bright illumination in order to keep the exposure time down. For this purpose, it can be advantageous to use a flashed illumination synchronised with a global shutter camera(s) than to emit light continuously.

The second sensor could also benefit from motion-compensated averaging of bursts of many images acquired with short exposure time. When reducing the exposure time to avoid blur, each image may become underexposed and/or noisy. To compensate, the camera can be run at a high frame-rate, and several such images can be averaged to reduce the noise. Before averaging, the motion can be compensated by shifting the images, based either on the global tracking sensor or by for instance an optical-flow algorithms which compares the 2D images in the burst to each other.

By implementation of a SFS sensor, that relies on acquiring a sequence of images with different lighting, the frames in the sequence also could preferably be motion-compensated to avoid measurement errors. By using the tracking sensor 6DOF data, the 2D images could be shifted and rotated or otherwise warped to compensate for the motion.

For instance, a shape-from-shading local measurement consist in minimum of three exposures. For an accurate data processing of these images a pixel-perfect constant field of view can be provided in order to improve accuracy of measuring data. Otherwise grey values of different local areas could be mixed together.

With a fast image sensor and fast illumination switching, the motion compensated burst averaging (described above) could also be combined with multi-shot sequence acquisition. If e.g. ten images for each illumination angle should be acquired, it could be beneficial to switch between the illumination directions at the highest possible rate and then repeat this sequence ten times. This would minimize the shifts between the phases of the sequence, and thus reduce measurement artefacts.

Alternatively or additionally, a TOF (time of flight) image sensor with three or more "taps" can be used since a switching between three or more light sources then could be done so fast (MHz switching rate, hundreds or thousands of repetitions before the images are read out) that there is practically no motion between the illumination that needs to be compensated.

In case of a comparatively small field of view of the second sensor, it could become difficult to identify from the data itself where each local image or 3D scan is taken. Here, the rough 3D model based on the first measuring data can be used as an index to show where the local scans were acquired. Using the index from a previous measurement, a scanner UI can also guide the user back to the same location to repeat capturing the same region on the object/body e.g. to do before/after comparisons.

To combine the global and local data the global measurement with the first sensor can be used as a 3D "index" or navigation help to catalogue the local measurements with the second senor, whereby the location of the local measurements are indicated on the global model without actually merging the data. After selecting one of the local measurements, it could then be displayed and/or analysed independently of the other scans. By separating the datasets, the global 3D model will be lightweight and fast to process and display, and it would be possible to perform local measurements at very high resolution.

The high-resolution local measurements could also be merged with the global scan 3D model. Wherever available, the local (second) data would be used to get the best possible resolution, and the global model would be used to fill in the gaps between the local measurements. If the second sensor (local sensor) is a 3D sensor, the shape (e.g. mesh) could be merged, and if the second sensor is a 2D camera, the colour texture could be merged. It would also be possible to merge the second sensor 3D data as a displacement-or surface-normal "texture map" to avoid modifying the actual mesh.

The registration of the second measuring data (local data) can be provided using poses e.g. provided by the first sensor. The 6DOF data provided by processing the first measuring data can be combined with factory-calibrated relationship between the first and the second sensor (local tracking sensors) to register the second measuring data (local data) so it can be combined and visualized on the global 3D model.

To further improve the registration accuracy, the second measuring data (local scanner data) could be matched to the global 3D model (e.g. derived from the first measuring data). In particular, if the second sensor (local scanner) provides a visual image, this image could be matched against the texture map of the 3D model to position it laterally. To improve the longitudinal position (i.e. along the optical axis of the second sensor), it could also be shifted so that the centre of the local measurement coincides with the global 3D model at that point.

In case the second measuring data (local 3D data) should be combined directly with the global model, it could also become advantageous to rotate the local patch, and possibly also bend it so it can be merged seamlessly with the global data. Especially for a SFS sensor the local patch can be bent into place.

A potentially faster option for merging high resolution surface data with the global model is to use texture mapping, whereby each vertex of the 3D mesh maps to a 2D image coordinate. Different parts of the mesh often map into different regions of the same texture image. The 2D image could be a regular colour image, but it could also define other aspects such as the surface normal vector or even a relative displacement perpendicular to the surface.

In particular, a 2D image typically has much higher resolution (more pixels) than the mesh has vertices. Thus, the apparent resolution of the model can be enhanced without having to refine the mesh.

To achieve photorealistic rendering of human faces, several such maps are typically used to control different aspects of the surface appearance. As an example, the "Digital Emily" model uses six maps to control diffuse, specular, single scatter and displacement.

BRIEF DESCRIPTION OF THE DRAWINGS

By way of example only, embodiments will be described more fully hereinafter with reference to the accompanying figures, wherein.

DETAILED DESCRIPTION

Figure 1:
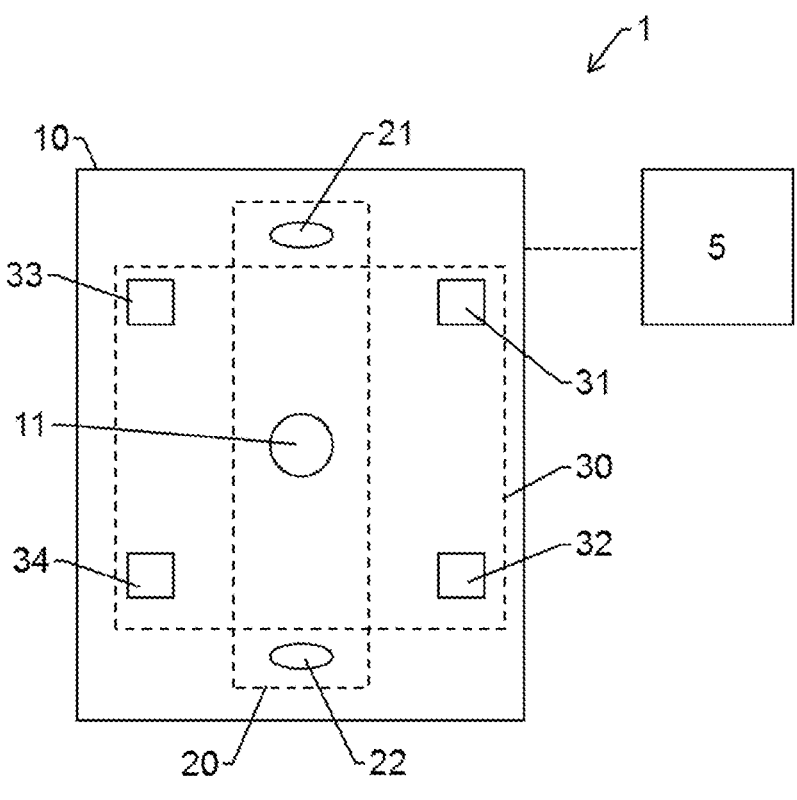
FIG. 1 shows an embodiment of a measuring system.

FIG. 1 shows an embodiment of a measuring system 1. The measuring system comprises a measuring device 10 and a controlling and processing unit 5.

In the shown embodiment, the measuring device comprises a camera 11, a first optical sensor 20 and a second optical sensor 30. The first optical sensor 20 provides a first field of view and is configured for collecting first measuring data representing a first part of the object.

Here, the first optical sensor 20 is implemented as a single-shot triangulation sensor as active-mono (structured light) system. "Active" is referred to as active projection of specific patterns, whereas "mono" and "stereo" stand for number of cameras used. The first optical sensor 20 comprises two projection devices 21 and 22 (projectors) for projecting the pattern. A random-dot pattern is amongst others one option. The density and size of local feature is correlated to the achieved lateral resolution and can be optimised with dedicated coding and matching technologies, such as binary coding, color coding, speckle pattern etc.

Each local feature of the observed pattern can unambiguously identified and assigned with individual pre-calibrated pixel-to-depth curve.

Figure 5:
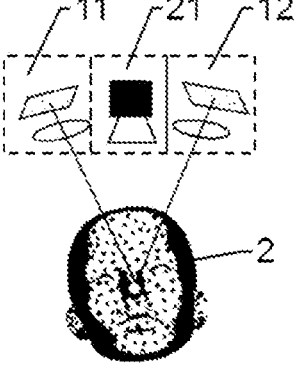
FIG. 5 shows a principle of triangulation-based measurement provided by a measuring system.

In contrast, the identification of local feature is not necessary for active-stereo system. Instead, the pixel coordinates in both cameras looking at the same local feature must be localized by matching algorithm. FIG. 5 shows an active-stereo system.

The camera 11 is used for detection of the projected pattern und thus for deriving surface information of an object to be measured as the first measuring data representing at least a first part of the object.

The second optical sensor 30 provides a second field of view and is configured for collecting second measuring data representing a second part of the object. Here, the second optical sensor comprises four light sources 31-34 configured for illuminating the object from four different directions (poses).

The second optical sensor 30 is implemented as a shape-from shading (SFS) sensor, wherein the camera 11 is also part of the SFS sensor 30.

Hence, the camera 11 is used by the first optical sensor 20 and by the second optical sensor 30. The camera 11 is part of the first optical sensor 20 and of the second optical sensor 30. Respective image capturing by the camera 11 is controlled by the controlling and processing unit 5. In other words: the measuring system 1 is configured to provide the first measuring data and the second measuring data by means of the camera 11.

For providing the first measuring data, the camera 11 is controlled to capture image data synchronised with pattern projection by the projectors 21 and 22.

For providing the second measuring data, the camera 11 is controlled to capture image data synchronised with illumination devices 31-34. For that, the controlling and processing unit 5 comprises a second capturing mode which is configured to provide the second measuring data by illuminating the object from the four different poses by performing at least four successive illumination steps with each illumination step providing activating one of the four light sources 31-34, in particular different from a light source activated before. At least four images are captured by capturing an image for each of the successive illumination steps. Surface topography information is derived based on processing the at least four images and the four different poses of the light sources 31-34. In an alternative embodiment, illuminating and image capturing can be performed simultaneously.

The first measuring data and the second measuring data can be referenced relative to each other by means of executing a respective referencing functionality provided by the controlling and processing unit 5. Referencing the data here means that the first and second measuring, e.g. points of respective point clouds or pixels of images, are assigned to surface points so that each value of the second measuring data is related to a particular value of the first measuring data, wherein both values are related to a particular point or region of the surface of the object.

Figure 2:
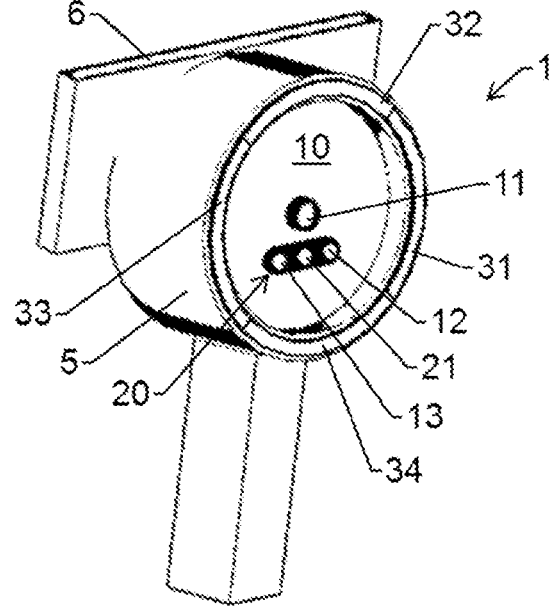
FIG. 2 shows an embodiment of a measuring system.

FIG. 2 shows an embodiment of a measuring system 1. The measuring system comprises a measuring device 10 and a controlling and processing unit 5. Furthermore, the measuring system 1 comprises a display 6.

In the shown embodiment, the measuring device comprises a first optical sensor 20 and a second optical sensor. The first optical sensor 20 provides a first field of view and is configured for collecting first measuring data representing a first part of the object.

The first optical sensor 20 is implemented as a (stereo) triangulation sensor and comprises a projection device 21 for projecting a light pattern and comprises two cameras 12 and 13 for detecting the pattern at the object, i.e. for capturing respective images of the projected pattern. Topographical surface information can be derived by processing the data provided by the cameras 12,13. Such topographical surface information is provided as the first measuring data.

The second optical sensor comprises a camera 11 which is arranged in the centre of the measuring device 10. Furthermore, the second optical sensor comprises four light sources 31-34 for illumining an object from four different poses.

The cameras 12 and 13 are used for detection of the projected patterns and thus for deriving surface information of an object to be measured as the first measuring data representing at least a first part of the object. The camera 11 is used in combination with the light sources 31-34 arranged around the camera 11. The light sources 31-34 provide a ring-like shape. Hence, the light sources 31-34 can preferably be configured as ring-diodes or segmented LED rings. Camera 11 and light sources 31-34 provide the second optical sensor.

The second optical sensor provides a local, high-resolution measurement compared to the first (global) optical sensor. The first optical sensor provides an overview sensor. Accordingly, the sizes of the fields of view of the sensors differ significantly, i.e. the field of view of the first (global) optical sensor is significantly greater than the field of view of the second sensor.

The measuring system 1 according to FIG. 2 is embodied as a hand-held device which is configured to be moved by an operator. The operator thus can align the measuring system 1 relative to the object to be measured and guide the device accordingly, e.g. to a region of interest at the object. Such design allows to perform more flexible and mobile measurements.

The display 6 on the back of the scanner 1 provides to show a live image to e.g. visualize the tracking (first) sensor field of view, give distance feedback and/or guide the user to follow a defined pattern at a specific maximum speed when doing a scan. The distance and pointing guide could be provided by an ellipse overlayed on the live image to show where and how large a region of interest, e.g. a head of a person, should be in the image.

A local scan (performed with the second optical sensor) needs to be acquired within a particular focus range and pointing at specific locations (as e.g. defined before the scan, or to repeat a previous measurement). Except for the roll-angle (around the optical axis) which can be compensated in software, the other five degrees of freedom need preferably to be guided to properly repeat a measurement.

Such relatively complex 5DOF guiding for local scans could be done for instance with a form of augmented-reality display with guides overlain on a live image. The distance to the object can here be shown by means of a marker a (e.g. two circles). The targeted field of view can be shown by overlaying a box on the image. The orientation of the box can also provide guidance for the roll-angle. The two tilt axes of rotation can be guided by overlaying arrows on the display.

To not lose track of the target area, the display could be automatically zoomed out so that the target marking remains within the displayed area.

Figure 3:
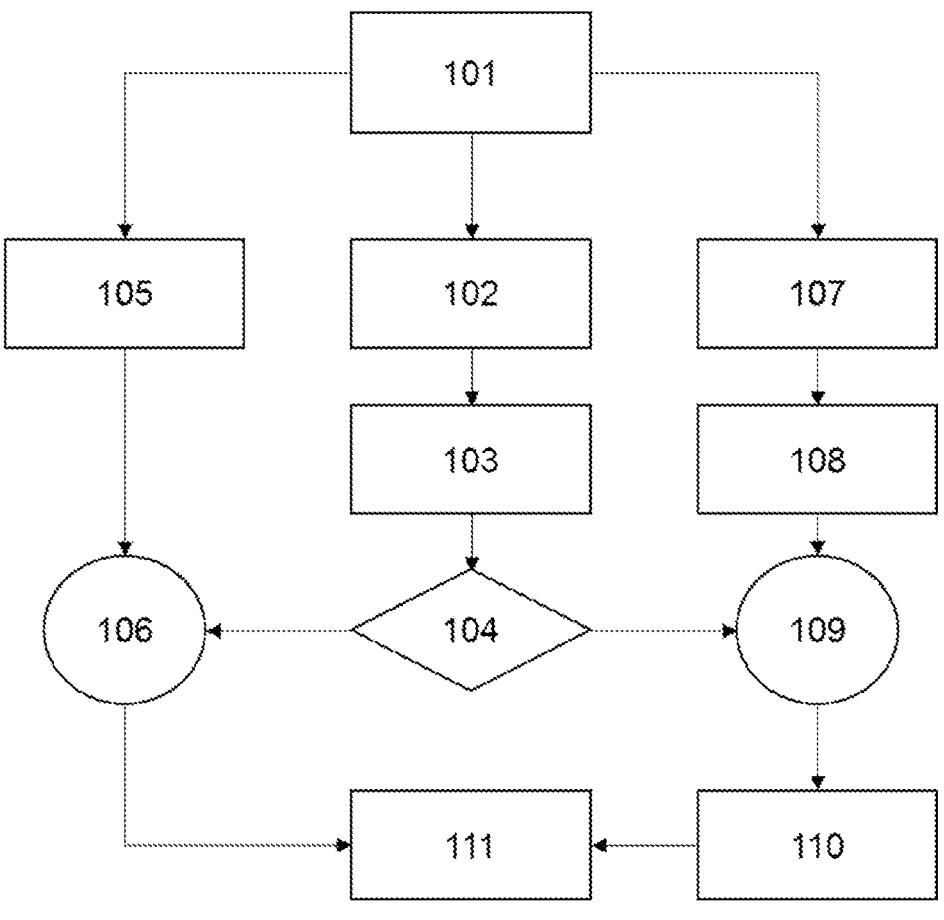
FIG. 3 shows a flow chart showing the steps of a measuring method.

As shown in FIG. 3, a measurement with the measuring system 1 of FIG. 2 can be provided by executing the shown steps. According to particular embodiments, the steps may be performed in different order compared to below. Of course, it is to be understood that the disclosure is not limited to the procedure below but also covers alternative methods comprising fewer or additional steps.

In step 101, the object, e.g. a part of a human body (e.g. face), and the measuring device 10 are positioned and aligned relative to each other to provide a distance between the object and the measuring device 10 which is within an allowed or desired measuring range. The object can be aligned relative to the measuring device 10 or vice versa.

In step 102, the first measuring data is acquired by controlling the first optical sensor. The projector 21 is controlled to emit a particular pattern or a defined sequence of patterns towards the object. Referring to the embodiment of FIG. 2, the cameras 12 and 13 are controlled to acquire image data related to the projected pattern or patterns. The cameras 12 and 13 may provide a single image or may provide a sequence of images (e.g. a video stream) of the object overlaid by the projection.

The projector 21 and/or the cameras 12,13 may comprise respective polarisation filters. The polarisation direction of a (linear) filter of the cameras 12,13 may be oriented perpendicular to the (linear) polarisation direction of the filters of the projector 21. By that, unwanted specular reflection can be suppressed.

With step 103, based on the image data, a 3D point cloud is computed representing the surface topography of the object.

Step 104 comprises computing a rough 3D model (e.g. mesh model) of the surface from the point cloud data.

In step 105, additionally, the light sources 31-34 can be controlled to be simultaneously activated and the camera 12 captures respective additional image data. Such additional image data provides determining texture data, e.g. a texture map. The texture data can be derived as albedo map, specular map and/or normal map.

Step 106 comprises fusing the texture data with the rough 3D model and thus providing a realistic representation of the object, in particular of a human face.

With step 107, a shape-from-shading (SFS) measurement is performed. This is provided by switching one light source of the four light sources 31-34 at a time on and take a respective exposures with the camera 11 (according to the embodiment of FIG. 2) during the illumination, in particular simultaneously. Then repeat this step for each light source. The sum of the acquired data is provided as SFS data. The SFS data provides high-resolution surface topography data. Alternatively, the light sources 31-34 are switched on at the same time (e.g. by each of the lights using a particular wavelength different from the others) and the camera takes the exposures simultaneously. Processing of the captured image data allows to discriminate the light information for each of the light sources.

Depending on the arrangement and respective assignment of the camera(s) to the light source, the steps 102 and 107 can be run simultaneously. This would in particular be available for the embodiment according to FIG. 2.

Step 108 comprises deriving surface normal based on the SFS data and—after the surface normal is derived, e.g. by numerically integrating—reconstructing a height map and an albedo map.

In step 109, the height map (SFS surface normal) is processed together with the 3D model and in step 110 a displacement map is derived based thereon. The displacement map can provide a relative surface normal based on the SFS surface normal and 3D model surface normal.

Step 111 provides fusing the displacement map with the 3D model and generating an updated 3D model which accurately represents the object.

By executing step 109, the registered measuring data can be provided since the first measuring data can be assigned to the second measuring data.

Alternatively or additionally, by executing step 111, the registered measuring data can be provided since here the first measuring data may be assigned to the second measuring data.

The light sources 31-34 are preferably implemented to be divergent and the camera 11 preferably has a wide-angle lens objective. Hence, the illumination and observation vectors are varying depending on position of point cloud. To calculate the unknown surface normal accurately and quickly by solving linear equation systems, the 3D model based on the first measuring data can be exploited as input. The displacement map with higher lateral resolution and depth sensitivity can be reconstructed from the four shading images. Data fusion of the displacement map and 3D data of first sensor enables to resolve fine 3D details of surface (e.g. skin) structures.

A crossed polarisation between (shape-from-shading) light sources 31-34 and camera 11 can serves to eliminate specular reflection. However, parallel polarisation can preferably be applied to SFS to avoid volume scattering and to get good contrast in fine detail. In addition, orthogonal polarisation between the pattern projector 21 and the cameras 12,13 can avoid unwanted volume scattering for 3D measurement with active triangulation sensor.

Figure 4A:
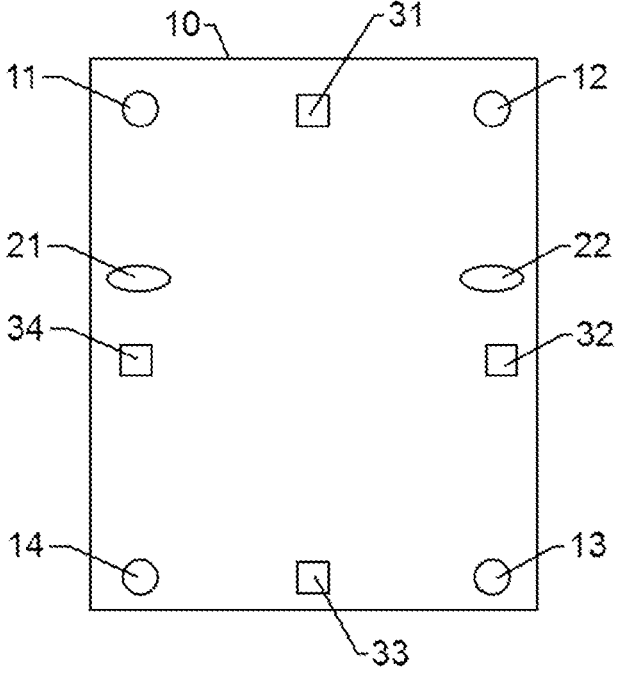
FIGS. 4a and 4b show embodiments of a measuring device of a measuring system.
Figure 4B:
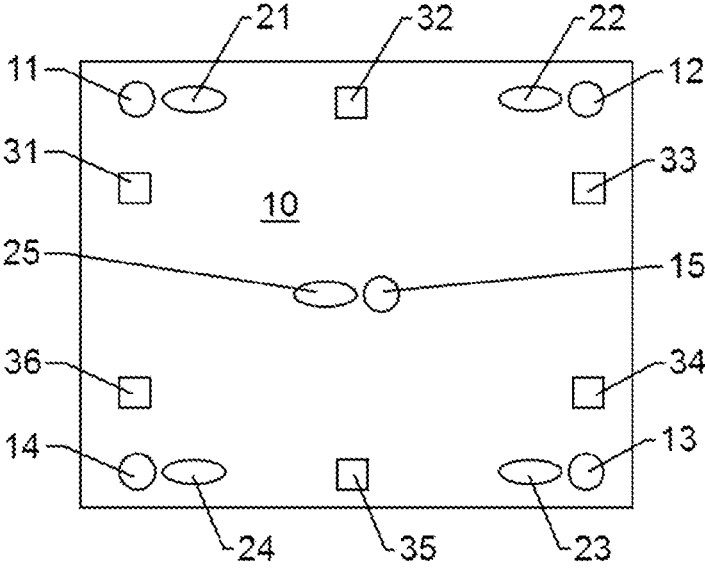

FIGS. 4*a* and 4*b* show embodiments of a measuring device 10.

The measuring device 10 according to FIG. 4*a* comprises four cameras 11-14, four illumination units 31-34 and two projectors 21,22. The projectors 21 and 22 are part of the first, global optical sensor and are configured to provide a pattern projection for triangulation-based measurement of a surface of an object. The respective projection at the object is captured by at least one, in particular by all four cameras 11-14. Accordingly, the at least one camera to capture the projection provides a part of the first sensor. A (rough) surface model can be derived based on the captured projection by processing distance data provided by the triangulation-based measurement.

Furthermore, the four illumination units 31-34 can be considered to be part of the first sensor as well. The four illumination units 31-34 can be controlled to simultaneously illuminate the surface of the object and the cameras 11-14 can respectively be controlled to capture images of the illuminated object. Texture data can be derived based thereon.

The polarisation direction of the four illumination units 31-34 may be oriented parallel to the polarisation direction of the cameras 11-14. A combined controlling of particular optical components which provides generation of surface data having a global character, e.g. low or medium resolution, should be understood to represent at least a part of the first (global) sensor.

Furthermore, the four illumination units 31-34 and at least one of the four cameras 11-14, in particular all of the four cameras 11-14, represent the second sensor when controlling the four illumination units 31-34 to sequentially (one light source after the other) illuminate the surface of the object and controlling the at least one camera to capture at least one image of each of the sequential illuminations. The image data acquired by that is processed according to a SFS algorithm to derive fine and high resolution (local) surface data.

Hence, a combined controlling of particular optical components which provides generation of surface data having a local character, e.g. high resolution, should be understood to represent at least a part of the second (local) sensor.

Hence, a (first or second) "sensor" should be understood as a particular way to control the components (light sources, projectors, and/or cameras) and the signal processing for deriving surface information in such particular way of controlling. "Sensor" should not be understood to be a particular structural arrangement of (optical) components, wherein such component are exclusively used for one particular type of data acquisition. The term "sensor" is not limited to a defined structural arrangement of components, i.e. not limited or exclusively comprising a particular combination of the components. To the contrary, the same camera can be used for different types of surface measurements and thus should be understood to be part of respective different types of sensors. Hence, "sensor" can define a dedicated measurement type, e.g. SFS or photogrammetry or active stereo/mono measurement.

FIG. 4*b* shows an embodiment of a measuring device 10 which comprises cameras 11-15, projectors 21-25 and illumination light sources 31-36.

Each of the cameras 11-15 is arranged to build a respective pair with one of the projectors 21-25. In particular, each pair provides a respective triangulation sensor which is configured to derive surface topography data by emitting a pattern to the surface and capturing respective images of the pattern projected to the surface, i.e. receiving a reflection of the pattern with the assigned camera. Hence, each of the camera-projector-pair can be considered to provide the first sensor. Additionally, the sum the camera-projector-pairs may be considered to provide the first sensor, as the data generated by all these pairs can be registered relative to each other and the combined data set provides surface data, i.e. the first measuring data.

The light sources 31-36 are distributed over the measuring device 10 in order to provide different angles for illuminating the object for performing a shade-from-shading (SFS) measurement. The light sources 31-36 are controlled to sequentially illuminate the object, i.e. one light source provides illumination at a time and the light sources are activated one after the other.

At least the centrally arranged camera 15 is controlled to capture images according to the sequential illuminations, i.e. the camera 15 captures at least one image for each of the illuminations with the light sources 31-36. Each of the images comprises image information regarding one particular direction of illumination and comprising respective shadow cast with respect to elevations and/or depressions at the surface of the object.

Such combined controlling provides the second sensor.

In one embodiment a group of cameras of the cameras 11-15 is controlled to acquire respective image data for SFS. At least two of the cameras are controlled this way. By that, extended image data can be obtained which provides respectively extended information regarding surface topography.

The image data obtained by SFS measurement is processed to derive highly resolved surface topography information of the object. The data processing can be provided according to the approach described above. As a result, a height map can be obtained as second measuring data, which height map represents a laterally resolved distribution of height values across the surface.

In one embodiment, the generation of the first measuring data and the generation of the second measuring data can be performed in "one single shot", which means that the entire illumination and image capturing steps are performed within one second and the whole measuring steps are considered as one single step in the perception of a user.

In one embodiment, the controlling and processing unit of the measuring system comprises a motion compensation functionality. The motion compensation functionality provides compensated surface topography information. The compensation can be performed by tracking of a position and/or orientation of the object relative to the measuring device 10 while capturing images, in particular while performing the SFS measurement. Such position and/or orientation tracking can be implemented as an image processing and image tracking procedure. A relative orientation information for each of the at captured images can be derived based on such tracking.

Respectively adjusted orientations for the captured images can be computed for providing corresponding orientations of the captured images relative to each other. Based thereon, respective compensated surface topography information can be computed by deriving the surface topography information by additionally processing the adjusted orientation. Hence, the images can be aligned relative to each other based on the tracking information and thus provide a corresponding basis for further data and image processing.

The embodiments of FIGS. 4a and 4b can preferably be implemented as stationary solutions.

FIG. 5 shows an embodiment of a first sensor of a measuring device. The first sensor provides a first and a second camera 11 and 12 and a projector 21. The projector is configured to project a pattern towards the surface of an object 2 to be measured. Here, the object 2 is a face of person. The cameras 11,12 are arranged relative to the projector 21 for receiving image data of the object 2 superimposed with the projected light pattern.

The first measuring data can be derived based on the appearance of the pattern on the object 2, e.g. based on the shape and/or size of the pattern.

Although aspects are illustrated above, partly with reference to some preferred embodiments, it must be understood that numerous modifications and combinations of different features of the embodiments can be made. All of these modifications lie within the scope of the appended claims.

The invention claimed is:

1. A measuring system for measuring an object, the measuring system comprising a measuring device and a controlling and processing unit, the measuring device comprises at least one camera, a first optical sensor and a second optical sensor, the first optical sensor provides a first field of view and is configured for collecting first measuring data representing a first part of the object, the second optical sensor provides a second field of view and is configured for collecting second measuring data representing a second part of the object, the second optical sensor comprises at least three light sources configured for illuminating the object from at least three different poses, the controlling and processing unit comprises a second capturing mode which is configured to provide the second measuring data by:

illuminating the object from the at least three different poses by performing at least three illumination steps with each illumination step providing illumination by one of the three light sources, capturing at least three images by capturing an image for each of the illumination steps, deriving surface topography information based on processing the at least three images and the at least three different poses of the light sources, and the controlling and processing unit comprises a referencing functionality which is configured to provide registered measuring data by referencing the first measuring data with the second measuring data, wherein the first optical sensor comprises a global light illumination source.

2. The measuring system according to claim 1, wherein the at least three illumination steps are performed successively by providing illumination by one of the three light sources different from a light source activated before.

3. The measuring system according to claim 1, wherein the at least three illumination steps are performed simultaneously by providing illumination by the at least three light sources at the same time, wherein the at least three illumination steps are performed by providing a particular illumination wavelength with each of the at least three light sources, wherein the particular illumination wavelengths of the light sources are different from each other respectively.

4. The measuring system according to claim 1, wherein the global light illumination source is a white light illumination source, in particular wherein the global light illumination source is provided by at least two of the at least three light sources of the second optical sensor.

5. The measuring system according to claim 1, wherein the global light illumination source comprises polarised filtering of a first orientation and the at least one camera comprises polarised filtering of a second orientation orthogonal to the first orientation.

6. The measuring system according to claim 1, wherein the first optical sensor is configured as a triangulation sensor having a pattern projector for projecting a light pattern on the object and at least two cameras, the cameras being arranged with defined and known poses relative to the pattern projector.

7. The measuring system according to claim 1, wherein each of the at least three light sources of the second optical sensor comprises polarised filtering of a first orientation and the at least one camera comprises polarised filtering of a second orientation parallel to the first orientation.

8. The measuring system according to claim 1, wherein the second measuring data is provided by performing a shape-from-shading (SFS) measurement and the surface topography information is provided as surface normal information of a normal map or height map.

9. The measuring system according to claim 1, wherein the controlling and processing unit comprises a first capturing mode which is configured to provide the first measuring data by:

illuminating the object or projecting a pattern on the object by means of the first optical sensor, capturing a set of images of the object during illuminating the object or projecting the pattern on the object and deriving first object data based on processing the set of images, wherein the first capturing mode comprises a step of deriving a point cloud for the first part of the object and/or the first capturing mode comprises a step of deriving a digital model of the first part of the object.

10. The measuring system according to claim 1, wherein the referencing functionality is configured to provide the registered measuring data as an enhanced digital model by:

computing a digital model of the first part of the object by means of the first capturing mode, the digital model provides rough surface normal information, providing the surface topography information as fine surface normal information by performing a shape-from-shading (SFS) measurement by means of the second capturing mode, updating the digital model to provide the enhanced digital model by adjusting the rough surface normal information utilising the fine surface normal information by replacing the rough surface normal information with the fine surface normal information, wherein the referencing functionality comprises the step of reconstructing a displacement map based on the fine surface normal information.

11. The measuring system according to claim 1, wherein the first optical sensor is configured for collecting the first measuring data by applying a simultaneous localisation and mapping algorithm during relative movement of the measuring device and the object.

12. A measuring system for measuring an object, the measuring system comprising a measuring device and a controlling and processing unit, the measuring device comprises at least one camera, a first optical sensor and a second optical sensor, the first optical sensor provides a first field of view and is configured for collecting first measuring data representing a first part of the object, the second optical sensor provides a second field of view and is configured for collecting second measuring data representing a second part of the object, the second optical sensor comprises at least three light sources configured for illuminating the object from at least three different poses, the controlling and processing unit comprises a second capturing mode which is configured to provide the second measuring data by:

illuminating the object from the at least three different poses by performing at least three illumination steps with each illumination step providing illumination by one of the three light sources, capturing at least three images by capturing an image for each of the illumination steps, deriving surface topography information based on processing the at least three images and the at least three different poses of the light sources, and the controlling and processing unit comprises a referencing functionality which is configured to provide registered measuring data by referencing the first measuring data with the second measuring data, wherein the controlling and processing unit comprises a motion compensation functionality which is configured to provide compensated surface topography information by:

tracking of a position and/or orientation of the object relative to the measuring device while performing the second capturing mode, determining a relative orientation information for each of the at least three images based on the tracking, computing an adjusted orientation for at least one of the at least three images for providing corresponding orientations of the at least three images, and deriving the compensated surface topography information by deriving the surface topography information by additionally processing the adjusted orientation.

13. A measuring system for measuring an object, the measuring system comprising a measuring device and a controlling and processing unit, the measuring device comprises at least one camera, a first optical sensor and a second optical sensor, the first optical sensor provides a first field of view and is configured for collecting first measuring data representing a first part of the object, the second optical sensor provides a second field of view and is configured for collecting second measuring data representing a second part of the object, the second optical sensor comprises at least three light sources configured for illuminating the object from at least three different poses, the controlling and processing unit comprises a second capturing mode which is configured to provide the second measuring data by:

illuminating the object from the at least three different poses by performing at least three illumination steps with each illumination step providing illumination by one of the three light sources, capturing at least three images by capturing an image for each of the illumination steps, deriving surface topography information based on processing the at least three images and the at least three different poses of the light sources, and the controlling and processing unit comprises a referencing functionality which is configured to provide registered measuring data by referencing the first measuring data with the second measuring data, wherein the measuring device comprises a hand-held body and the at least one camera, the first optical sensor and the second optical sensor are arranged in or at the hand-held body.

\* \* \* \* \*